US010300436B2

(12) United States Patent  
Townsend et al.

(10) Patent No.: US 10,300,436 B2  
(45) Date of Patent: May 28, 2019

(54) MEMBRANE SYSTEM TO TREAT LEACHATE AND METHODS OF TREATING LEACHATE

(71) Applicants: University of Florida Research Foundation, Inc., Gainesville, FL (US); Alachua County Public Works, Gainesville, FL (US)

(72) Inventors: Timothy Townsend, Gainesville, FL (US); Ronald Bishop, High Springs, FL (US); David Wood, Gainesville, FL (US); James Lloyd, Gainesville, FL (US)

(73) Assignees: University of Florida Research Foundation, Inc., Gainesville, FL (US); Alachua County Public Works, Gainesville, FL (US)

( * ) Notice: Subject to any disclaimer, the term of this patent is extended or adjusted under 35 U.S.C. 154(b) by 180 days.

(21) Appl. No.: 15/367,371

(22) Filed: Dec. 2, 2016

(65) Prior Publication Data

US 2017/0081218 A1    Mar. 23, 2017

Related U.S. Application Data

(63) Continuation of application No. 13/886,321, filed on May 3, 2013, now Pat. No. 9,540,254.

(60) Provisional application No. 61/642,494, filed on May 4, 2012, provisional application No. 61/773,218, filed (Continued)

(51) Int. Cl.
*B01D 61/02* (2006.01)
*C02F 1/44* (2006.01)
*B01D 61/08* (2006.01)

*C05C 3/00* (2006.01)
*C02F 103/06* (2006.01)

(52) U.S. Cl.
CPC ........ *B01D 61/025* (2013.01); *B01D 61/022* (2013.01); *B01D 61/08* (2013.01); *C02F 1/44* (2013.01); *C02F 1/441* (2013.01); *C02F 1/442* (2013.01); *C05C 3/00* (2013.01); *B01D 2317/025* (2013.01); *B01D 2317/04* (2013.01); *C02F 1/444* (2013.01); *C02F 2103/06* (2013.01); *C02F 2301/08* (2013.01)

(58) Field of Classification Search
CPC .. C02F 1/44; C02F 1/441; C02F 1/444; C02F 1/442; C02F 2103/06; C02F 2103/08; C05C 3/00; B01D 61/022; B01D 2317/025; B01D 2317/04; B01D 61/025; B01D 61/08

See application file for complete search history.

(56) References Cited

U.S. PATENT DOCUMENTS 5,607,592 A    3/1997   Bernard
6,113,797 A    9/2000   Al-Samadi (Continued)

OTHER PUBLICATIONS

"Leachate Treatment using Reverse Osmosis at the Alachua County Southwest Landfill", 4th Quarterly Report, Apr. 4, 2013 to Jul. 3, 2013, Modification No. 0162541-017 to Permit No. 0162541-006-SF WACS No. NED/01/0029652, 29 pages.

*Primary Examiner* — John Kim
(74) *Attorney, Agent, or Firm* — Thomas|Horstemeyer, LLP

(57) ABSTRACT

Embodiments of the present disclosure provide for systems for removing contaminants from a leachate, methods of removing contaminants from a leachate, and the like.

7 Claims, 7 Drawing Sheets

Related U.S. Application Data on Mar. 6, 2013, provisional application No. 61/777,138, filed on Mar. 12, 2013.

(56) References Cited

U.S. PATENT DOCUMENTS

| | | |
|---|---|---|
| 6,508,936 B1 | 1/2003 | Hassan |
| 2007/0181473 A1* | 8/2007 | Manth ................ B01D 61/022 210/137 |

\* cited by examiner

MEMBRANE SYSTEM TO TREAT LEACHATE AND METHODS OF TREATING LEACHATE

CLAIM OF PRIORITY TO RELATED APPLICATION

This application is a continuation of, and claims priority to, U.S. patent application Ser. No. 13/886,321, filed in the United States entitled "MEMBRANE SYSTEM TO TREAT LEACHATE AND METHODS OF TREATING LEACHATE" on May 3, 2013, U.S. Pat. No. 9,540,254, which is entirely incorporated herein by reference. U.S. patent application Ser. No. 13/886,321, claims priority to U.S. provisional application entitled "MEMBRANE SYSTEM TO TREAT LEACHATE AND METHODS OF TREATING LEACHATE" having Ser. No.: 61/642,494, filed on May 4, 2012, which is entirely incorporated herein by reference. U.S. patent application Ser. No. 13/886,321, claims priority to U.S. provisional application entitled "MEMBRANE SYSTEM TO TREAT LEACHATE AND METHODS OF TREATING LEACHATE" having Ser. No.: 61/773,218, filed on Mar. 6, 2013, which is entirely incorporated herein by reference. U.S. patent application Ser. No. 13/886,321, claims priority to U.S. provisional application entitled "MEMBRANE SYSTEM TO TREAT LEACHATE AND METHODS OF TREATING LEACHATE" having Ser. No.: 61/777,138, filed on Mar. 12, 2013, which is entirely incorporated herein by reference.

BACKGROUND

Researchers estimate that between 900 million to 9 billion gallons of landfill leachate are produced annually in the United States, with an estimated 250 million gallons annually being managed in Florida. This volume of wastewater raises environmental and economic concerns, and represents an opportunity to reclaim both water and nutrients from a wastewater stream that is currently being "thrown away."

Leachate is water is partly inherent in solid waste and partly the result of rainfall that falls on the wastes after placement in a landfill, which subsequently becomes contaminated with a variety of chemicals contained in the solid waste. Landfill leachate is characterized by heavy metals, high chemical oxygen demand (COD) and biological oxygen demand (BOD) compounds, total organic carbon (TOC), volatile organic carbons (VOC), ammonia-nitrogen, suspended solids and can contain other compounds that resist biological decomposition. Chemical constituents of leachate can be toxic or carcinogenic, and certain compounds can emit objectionable odors. Landfill leachate can also transport viruses and bacteria harmful to human health.

Leachate management methodologies became necessary in the 1980's when the US Environmental Protection Agency (EPA) and state regulatory agencies began adopting the "dry tomb" approach to landfill construction which requires new landfill cells to have bottom and top liners, as part of leachate management systems. Soon after implementing these regulations researchers began to investigate the effects of adding water or recirculating leachate to the lined cells. This research confirmed that recirculation of leachate accelerates gas production and the degradation of organic waste. This so called "wet cell" research led to the development of "bioreactor landfills" in which significant quantities of leachate are recirculated while organic waste is being degraded. Once biological activity in the cells ceases, however, bioreactor landfill operators need methods to dewater the cells and dispose of or treat the leachate.

Leachate is managed in a variety of ways including trucking or piping leachate to a wastewater treatment plant (WWTP), deep well injection with minimal treatment, evaporation, biological uptake of constituents in engineered wetlands, and various chemical treatment processes. Some facilities use more than one method. All methods of processing leachate use energy and can have negative environmental impacts. Few WWTPs are designed to treat leachate, which disrupts biological treatment in all but the smallest amounts.

An on-site treatment method that minimizes energy consumption and adverse impacts such as odors, captures the inherent macro and micro nutrients in the leachate, segregates heavy metals and VOCs, dewaters the cell, and provides reuse of the decontaminated water is therefore desirable.

Thus there is a need to address and/or overcome these deficiencies.

SUMMARY

In accordance with the purpose(s) of the present disclosure, as embodied and broadly described herein, embodiments of the present disclosure, in one aspect, relate to a systems for removing contaminants from a leachate, methods of removing contaminants from a leachate, and the like.

In an embodiment, a membrane system, among others, includes: a first stage including one or more membranes selected from the group consisting of: a reverse osmosis membrane and a nanofiltration membrane, wherein a leachate is introduced to the first stage to separate the leachate into a first stage concentrate and a first stage permeate; and a second stage including one or more membranes selected from the group consisting of: a reverse osmosis membrane and a nanofiltration membrane, wherein the first stage and the second stage are in fluidic communication, wherein the first stage permeate is introduced to the second stage to separate the first stage permeate into a second stage concentrate and a second stage permeate. In an embodiment, the first stage and the second stage is adapted to reject about 95% or more of contaminates in the leachate.

In an embodiment, a method of treating leachate, among others, includes: introducing a leachate to a first membrane system to separate the leachate into a first stage concentrate and a first stage permeate, and introducing the first stage permeate to a second membrane system to separate the first stage permeate into a second stage concentrate and a second stage permeate. In an embodiment, the second stage permeate has about 95% less contaminates than the leachate.

In an embodiment, a recursive concentrate reduction membrane system, among others, includes: a first stage including one or more membranes selected from the group consisting of: a reverse osmosis membrane and a nanofiltration membrane, wherein a leachate is introduced to the first stage to separate the leachate into a concentrate and a permeate. In an embodiment, the first stage and the second stage is adapted to reject about 95% or more of contaminates in the leachate.

In an embodiment, a method of treating leachate, among others, includes: introducing a leachate to a membrane system to separate the leachate into a concentrate and a permeate, wherein the permeate has about 5% or less of contaminates of the leachate.

In an embodiment, a method of treating leachate, among others, includes: introducing a leachate to a membrane system to separate the leachate into a concentrate and a permeate, wherein the concentrate and permeate are mixed or used separately to produce a fertilizer for terrestrial or aquatic substrates. In an embodiment the leachate is treated using various applied pressures which produce a target water quality of concentrate and permeate that is mixed or used separately to produce a fertilizer, fertilizer-equivalent, or partial-fertilizer for terrestrial and aquatic substrates.

Other structures, compositions, methods, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
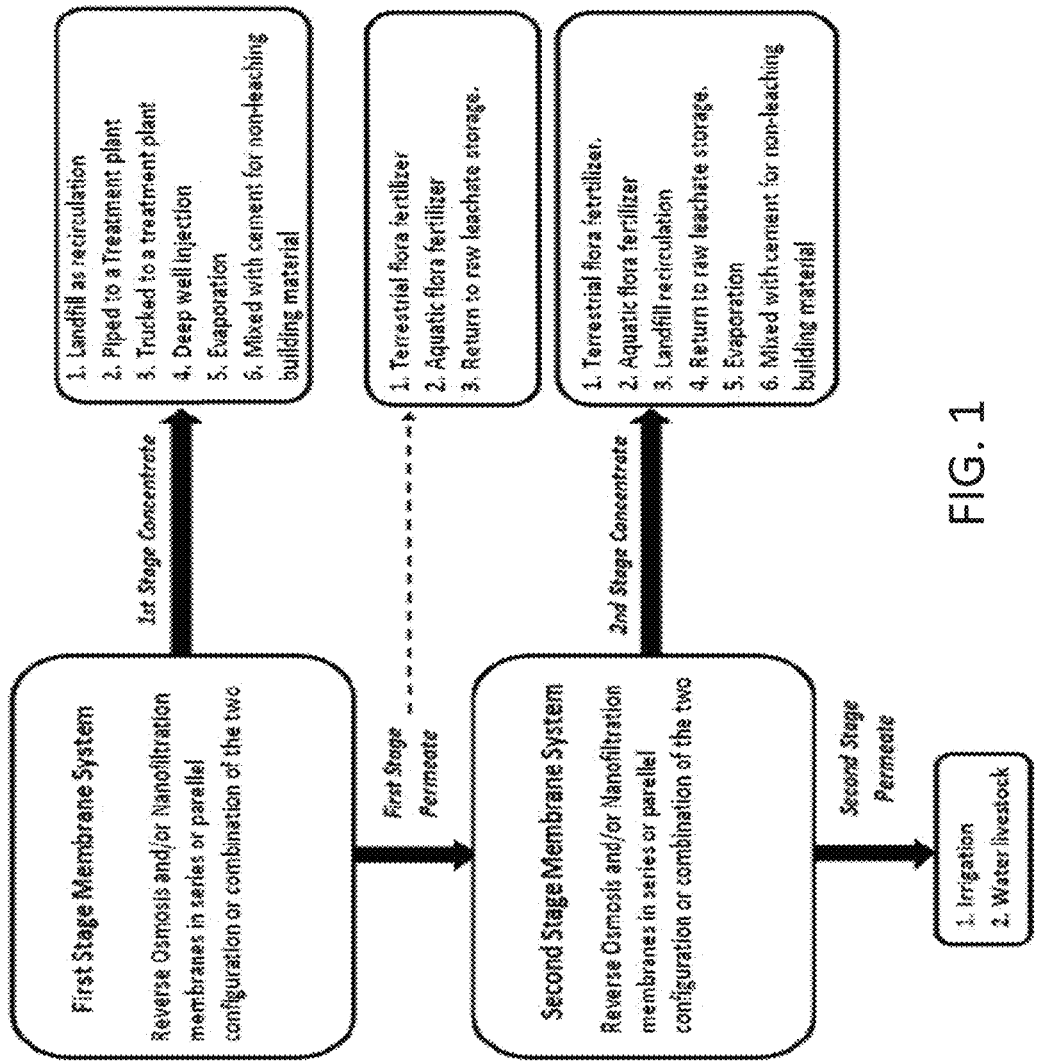
FIG. 1 includes a membrane system that can be used to treat leachate to remove contaminants.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

General Discussion

Embodiments of the present disclosure provide for systems for removing contaminants from a leachate, methods of removing contaminants from a leachate, and the like. In particular, embodiments of the present disclosure provide for membrane systems and methods of using membrane filtration and diffusion such as reverse osmosis and/or nanofiltration to remove contaminates from a leachate. Embodiments of the present disclosure can be advantageous in that contaminates can be substantially removed from a leachate such as one from a landfill in an economical manner.

In an embodiment, the contaminants can include heavy metals, high chemical oxygen demand (COD) and biological oxygen demand (BOD) compounds, total organic compounds (TOC), volatile organic compounds (VOC), ammonia-nitrogen, suspended solids and can contain other compounds that resist biological decomposition.

In an exemplary embodiment, a membrane system that can be used to treat leachate, such as landfill leachate, to remove contaminants by use of a single stage, a two stage, or a multi-stage (e.g., 3, 4, 5, and the like) system is provided and described in the figures.

Figure 6:
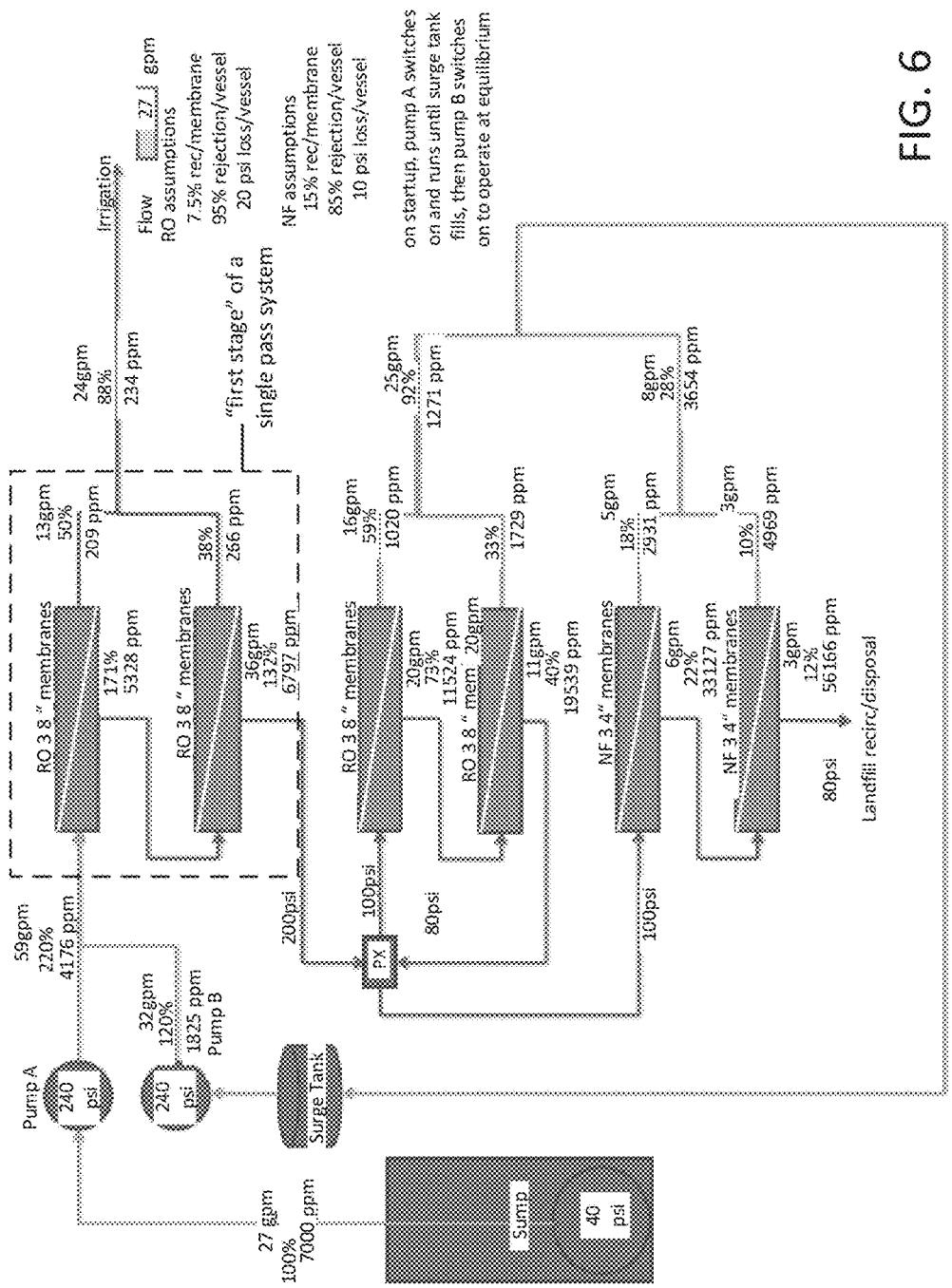
FIG. 6 is a diagram of the recursive concentrate reduction system.
Figure 7:
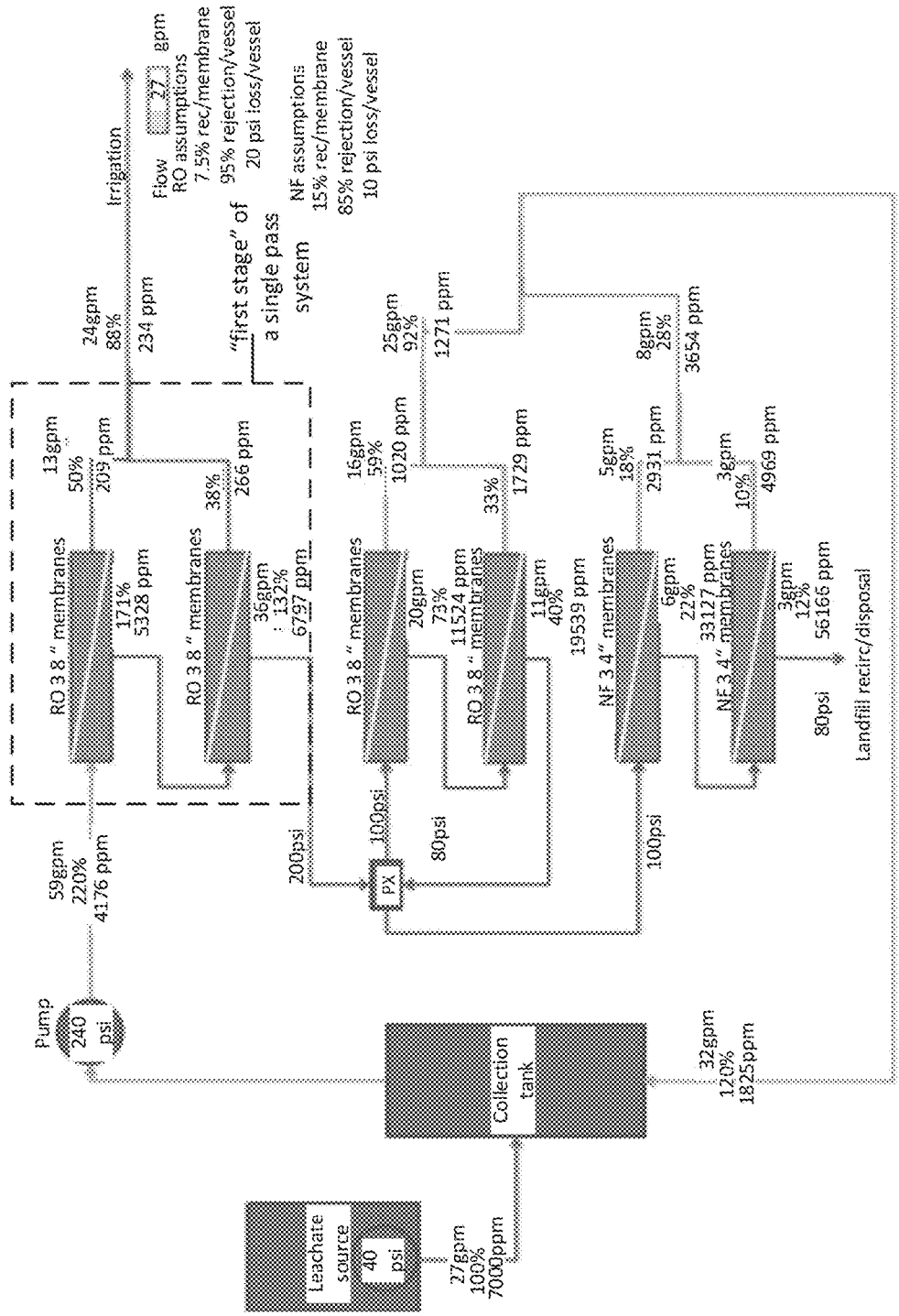
FIG. 7 is a diagram of the recursive concentrate reduction system drawing from a leachate collection tank rather than directly from the sump.

An exemplary embodiment of the present disclosure as shown in FIGS. 6 and 7 includes a membrane system that can be used to treat leachate to remove contaminants using a single stage system or a recursive concentrate reduction system. While the recursive concentrate reduction system may be considered to have two stages, the product of the "$1^{st}$ stage" is clean water. The $2^{nd}$ stage treats the waste from the $1^{st}$ stage so that a significant portion of it can be recycled through the process back to the $1^{st}$ stage. FIG. 7 is a diagram of the recursive concentrate reduction system drawing from a leachate collection tank rather than directly from the sump, as shown in FIG. 6. Although FIGS. 6 and 7 provide specific dimensions of the membranes and the achievement of certain reductions in contaminants, these are only for illustrative purposes, and embodiments of the present disclosure are not limited by these.

In an embodiment for a recursive concentrate reduction system, the first stage of the recursive concentrate reduction membrane system can include one or more reverse osmosis (RO) membranes and/or nanofiltration membranes that are connected in series, parallel, or a combination thereof. Raw leachate or pre-filtered leachate can be pumped through the membrane(s) to form a concentrate and a permeate. Based on the number of stages the recovery rate of permeate (volume of water recovered to feed water treated) can vary from about 20% to 90%. In an embodiment, components of the first stage can be connected using pipes. In an embodiment, one or more pipes can be used to flow, independently, the permeate and the concentrate out of the membranes to appropriate destinations.

In an embodiment, the concentrate can be additionally filtered and recycled back to the first stage (See FIGS. 6 and 7), re-circulated to the landfill, moved to a treatment plant, and/or injected into a deep well. In an embodiment, the permeate can be used in irrigation and/or as water for livestock. In an embodiment, the permeate can achieve about 90% or more, about 95% or more, about 98% or more, or about 99% or more, rejection of most contaminants that were in the raw leachate. The permeate has about 1% or less of the chloride, ammonia, total dissolved solids, and most toxic metals found in the raw leachate. In certain embodiments, a dewatering yield of about 20% to 95% can be achieved.

An exemplary embodiment of the present disclosure as shown in FIG. 1 includes a membrane system that can be used to treat leachate, such as landfill leachate, to remove contaminants using a first stage and a second stage that are in fluidic communication.

In an embodiment, the first stage of the membrane system can include a one or more reverse osmosis (RO) membranes and/or nanofiltration membranes that are connected in series, parallel, or a combination thereof. Raw leachate or pre-filtered leachate can be pumped through the membrane(s) to form a first stage concentrate and a first stage permeate. The permeate recovery rate of this first stage is expected to vary from about 15% and 90% depending on the number and arrangement of the membranes. In an embodiment, components of the first stage can be connected using pipes. In an embodiment, one or more pipes can be used to flow the permeate out of the membranes to the second stage and one or more pipes can be used to flow the first stage concentrate to the other membrane(s) and/or to other destinations. In an embodiment, the first stage concentrate can be recirculated to the landfill, moved to a treatment plant, and/or injected into a deep well. In an embodiment, the first stage permeate can be flowed to the second stage of the membrane system, used as a flora fertilizer, and/or returned to the leachate sump/wet well to mix with the raw leachate. In an embodiment where the first stage permeate is returned to the sump/wet well, the salinity of the raw leachate is reduced which reduces the osmotic pressure required to pump the leachate through the membrane system. In an embodiment, the first stage permeate can achieve about 90% or more, or about 95% or more, rejection of most or all of the contaminants that were in the raw leachate. The first stage permeate has about 10% or less of the chloride, ammonia, total dissolved solids, and most toxic metals found in the raw leachate.

In an embodiment, the second stage of the membrane system can include one or more RO membranes and/or nanofiltration membranes that are connected in series, parallel, or a combination thereof. After flowing through the second stage, the first stage permeate is separated into a second stage concentrate and a second stage permeate. The permeate recovery rate of this stage is expected to vary from about 15% and 40% depending on the arrangement of membranes. In an embodiment, one or more pipes can be used to flow the permeate out of the membranes to the desired location and one or more pipes can be used to flow the concentrate to the other membrane(s) and/or to other destinations. In an embodiment, the second stage concentrate can be used as a flora fertilizer, in landfill recirculation, and/or returned to the leachate sump/wet well to mix with the raw leachate. In an embodiment where the second stage concentrate is returned to the sump/wet well, the salinity of the raw leachate is reduced which reduces the osmotic pressure required to pump the leachate through the membrane system. In an embodiment, the second stage permeate can be used in irrigation and/or as water for livestock. In an embodiment, the second stage permeate can achieve about 90% or more, about 95% or more, about 98% or more, or about 99% or more, rejection of most contaminants that were in the raw leachate. The second stage permeate has about 1% or less of the chloride, ammonia, total dissolved solids, and most toxic metals found in the raw leachate. In certain embodiments, a dewatering yield of about 20% to 95% can be achieved.

In an embodiment, the RO and nanofiltration membranes can include spiral, tubular, hollow fiber, cellulose acetate, composite polyamide, or a combination thereof. In an embodiment, the dimensions of the membranes can be about 4 inches to 8 inches in diameter and 40 inches to 60 inches in length. In an embodiment, in the design of the membrane system and in the selection of the RO and/or nanofiltration membranes in each stage, one should consider the relative surface area of the membranes in each stage and the pressure as well as whether the RO membranes are in series, parallel, or a combination, so that both first and second stage permeate flows are equal.

In an embodiment, the RO and/or nanofiltration membranes can be cleaned by conventional membrane cleaning procedures such as by manual operator or automatic actuators that change various valve positions.

In an embodiment, the RO and/or nanofiltration membranes can include those that were previously used at potable treatment plants, so an additional advantage is realized by recycling the RO and/or nanofiltration membranes. In addition, the RO and/or nanofiltration membranes can be cleaned and reused to further reduce costs.

In an embodiment, the membrane system can include one or more pumps to cause the leachate, concentrate, and permeate to flow through the membrane system, in particular the RO and/or nanofiltration membranes. The pressure that can be used can depend upon the design of the membrane system, the RO membranes, the nanofiltration membranes, the leachate, the concentrate, the permeate, the desired flow rate, the desired dewatering rate, and the like. In general the pressure can be about 50 to 800 psi. In certain embodiments, the membrane system uses lower pressures to reduce energy consumption, i.e., the first stage operating at about 50 to 300 psi and the second stage is operating at about 50 to 300 psi.

In an embodiment, the membrane system can include one or more filters to remove larger particles from the leachate, the concentrate, and/or the permeate. This may be done to improve the efficiencies of the membrane system and RO and/or nanofiltration membranes and increase their useful lifetime.

In an embodiment, nanofiltration membranes can be used in conjunction with RO membranes to further treat the leachate. In this configuration, a higher permeate recovery and dewatering rate is achieved.

In an embodiment, the membrane system can include other components such as storage tanks, flow controllers, computer system to monitor the flow, sensors to monitor the level of contaminants and other components in the leachate, the concentrate, and/or the permeate, and the like.

In an embodiment, the leachate, the concentrate, and/or the permeate, can be subject to chemical treatment to increase the removal of one or more contaminants. For example, the leachate, the concentrate, and/or the permeate, can be subjected to pH change to increase the removal of certain metals via precipitation.

It can be advantageous that the permeate (e.g., "single pass" system permeate or second stage permeate) meets U.S. environmental discharge standards. In an embodiment, this can be obtained using a recursive concentrate reduction system. In an embodiment, this can be obtained by the use of the second stage of the membrane system, which removes additional contaminants from the first stage permeate.

Another advantage includes capturing beneficial nutrients in first stage permeate and second stage concentrate and re-using these constituents, including ammonia-nitrogen, as a fertilizer for cultivating various photosynthetic flora has been demonstrated. In an embodiment, the first stage permeate and second stage concentrate is equivalent to commercial liquid fertilizer.

Another advantage is derived by mixing of second stage concentrate and/or the first stage permeate with raw leachate in the leachate sump, which enhances system operational stability by decreasing the initial feed stock salinity during operation.

In an embodiment, the process can include flowing the raw leachate from a landfill cell to a collection sump. The raw leachate can be pumped through a filter (e.g., a one micron filter), and the filtered leachate is further pressurized before entering the first stage of membrane system to produce, which produces two product flows, a first stage permeate and a first stage concentrate. The first concentrate can be re-circulated back into the landfill cell, while the first stage permeate can be pumped through a second one-micron filter, and then further pressurized before entering the second stage of membrane system, which also produces two products, the second stage concentrate and the second stage permeate.

In an embodiment, the second stage concentrate has been effectively stripped of all landfill contaminants except for ammonia-nitrogen at roughly about 100 ppm and some macro-nutrients and micro-nutrients. In an embodiment, the second stage concentrate is suitable as a liquid fertilizer that can used to grow a number of plant species.

In an embodiment, the second stage permeate has been stripped of most all (e.g., about 95 or more or about 99% or more) landfill contaminants except for ammonia-nitrogen at about 5 ppm, just above the US EPA groundwater standard of 2.8 ppm. At that level of purity, it can be safely discharged to a landfill spray field where vegetative cover, such as turf grass, uptake the remaining ammonia. In an embodiment, the first stage permeate has been stripped of most all (e.g., about 90 or more or about 95% or more) landfill contaminants except for ammonia-nitrogen at about 100 ppm. The first stage permeate is safely discharged to a landfill spray field where vegetative cover, such as turf grass, uptake the remaining ammonia and/or the first stage permeate is used as flora fertilizer.

In an embodiment, the flow ratio of second stage permeate to raw leachate achieved can be about 20%. If all of the second stage concentrate is used as a liquid fertilizer by algae or various plant species, the de-watering yield would be about 50%.

Figure 2:
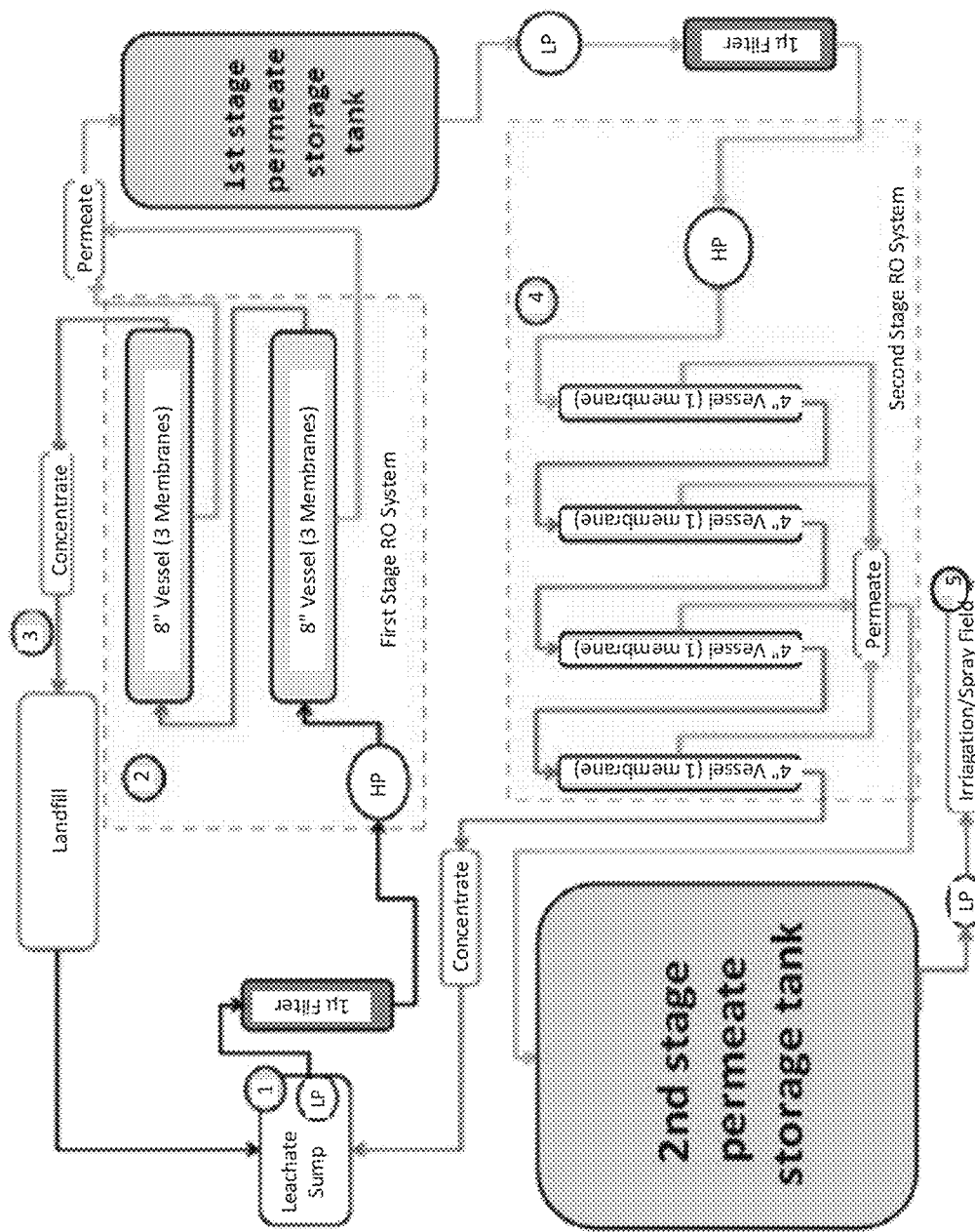
FIG. 2 shows a schematic of a membrane system that treats landfill leachate.

FIG. 2 shows a schematic of a membrane system that treats landfill leachate. The membrane system includes a first stage (top portion) and a second stage (bottom portion). The first stage of the membrane system can include a pair of reverse osmosis (RO) membranes that are connected in series; however, more than two RO membranes could be used and/or nanofiltration membranes may be added or used. The number and dimensions of the RO membranes in the first stage can vary depending upon the use (e.g., amount of water flowing, particles present, the design of the second stage, and the like). The first stage permeate can be directed to the second stage. The second stage of the membrane system can include four RO membranes that are connected in series; however, more than four RO membranes could be used and/or nanofiltration may be added or used. The number and dimensions of the RO membranes in the second stage can vary depending upon the use (e.g., amount of water flowing, particles present, the design of the first stage, use of the second stage permeate, and the like).

In general, the treatment process using the system shown in FIG. 2 is described below. Step 1: Raw, untreated leachate is collected and stored in a sump. Leachate is then pumped at about 20 to 30 psig through a one micron filter to remove suspended particulates from the leachate. The pump, pressure of pumping and the filter can be modified to suit desired needs and results. Step 2: The filtered leachate is then pumped to a higher pressure of about 240 psig or more to the first stage of the RO system. The first stage system can include two, 8-inch diameter by 10 foot RO membranes, for example. Concentrate from the first vessel is fed in series to the second 8-inch RO membranes. Permeate from both vessels are mixed and delivered to a storage tank. Permeate from this stage has achieved in excess of 95% rejection of most contaminants, for example. This permeate may be considered final in an embodiment, or more treatment (e.g., removal) may be performed. Step 3: Concentrate from the RO membrane is recirculated under pressure to the landfill, for example, or further treated to reduce its volume using other membranes. Step 4: The second stage of the RO system uses four, 4-inch diameter by 40-inch length RO spiral wound membranes connected in series, for example. This stage can produce two effluents: second stage concentrate and second stage permeate. The second stage concentrate is sent back to the leachate storage to mix with the raw leachate. The pressure energy may also be recovered to drive other stages of the process. In an embodiment, the system can include a pressure exchanger which can be used to transfer pressure energy from a high pressure concentrate stream to a low pressure concentrate stream. The second stage permeate is sent to an irrigation holding tank, for example. The second stage achieves in excess of 95% rejection of most of the remaining contaminants. Step 5: The stored permeate is used to irrigate the landfill's vegetative cover, for example. The vegetative cover consumes the ammonia-nitrogen remaining in the permeate allowing for low nutrient discharge.

Figure 3:
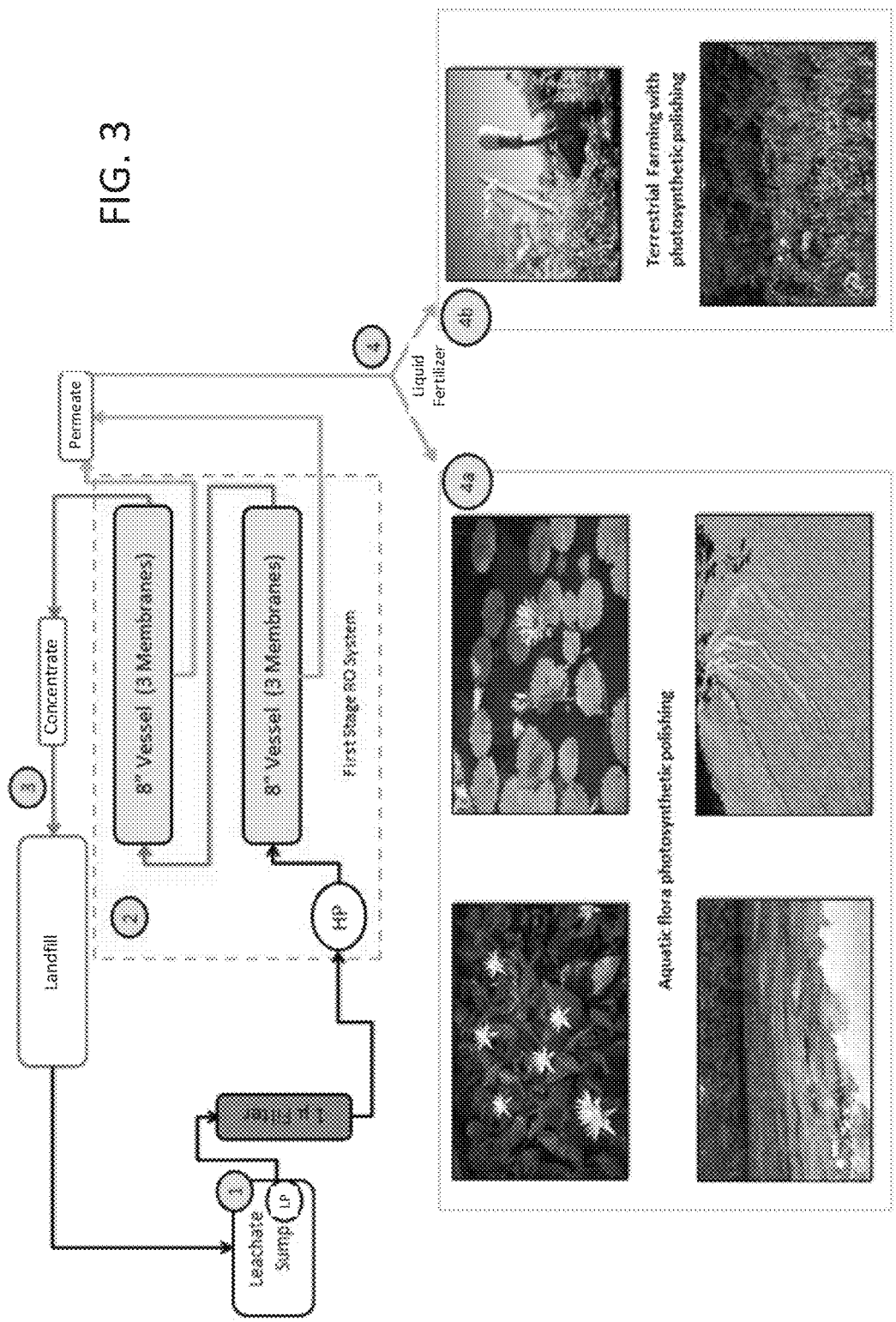
FIG. 3 shows a schematic of an alternative configuration for a membrane system that treats landfill leachate.

FIG. 3 shows a schematic of an alternative configuration for a membrane system that treats landfill leachate. Steps 1 to 3 are the same as in FIG. 2. This configuration differs at step 4, where first stage permeate is treated via two potential methods, both of which remove remaining ammonia-nitrogen. One demonstrated polishing methodology utilizes aquatic flora photo synthesis (step 4a), while the other polishing methodology uses the permeate in terrestrial farming applications (step 4b). This configuration of the system achieves a 50% dewatering yield as well as producing a liquid fertilizer equivalent to commercial fertilizers.

Figure 4:
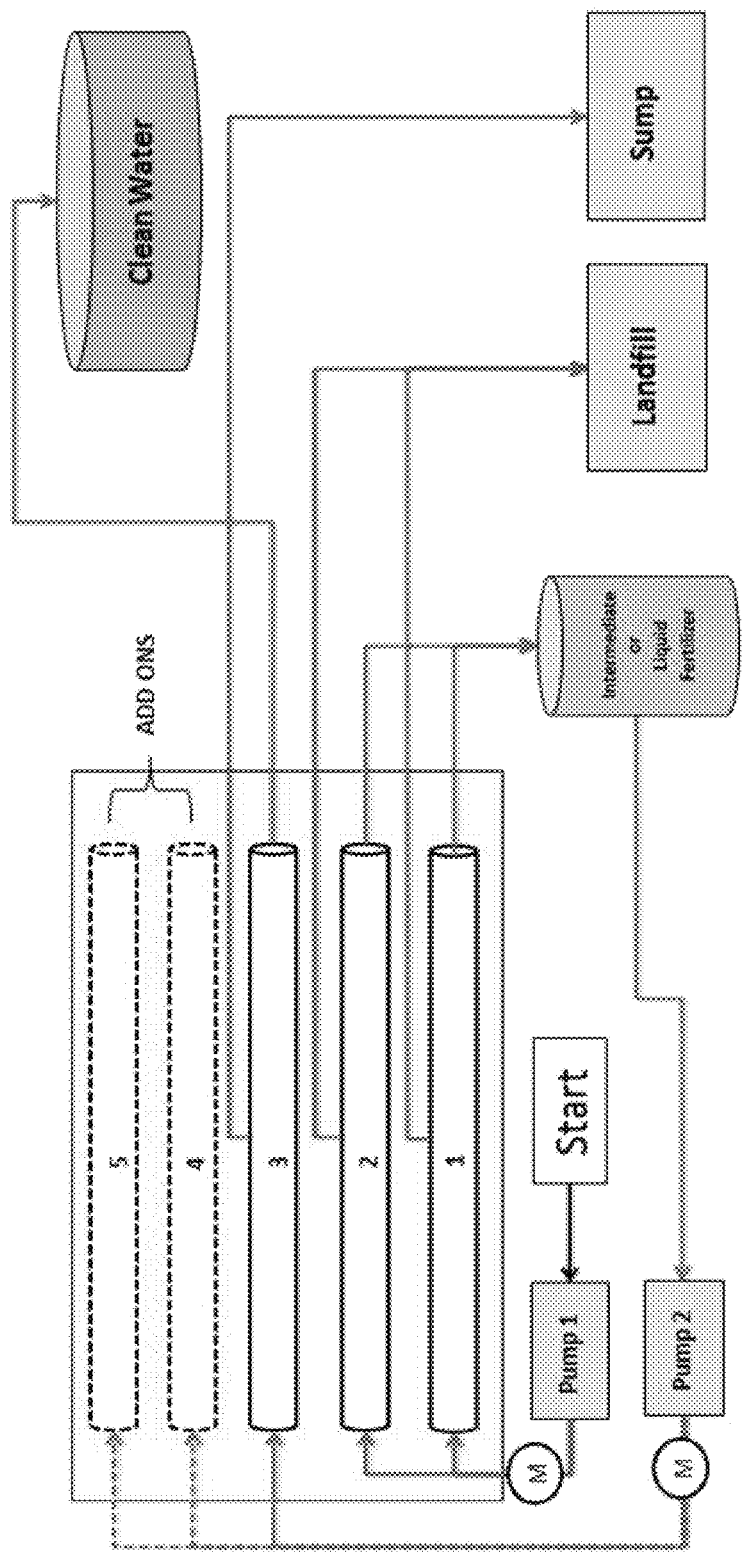
FIG. 4 shows a schematic of an alternative configuration that may realize additional dewatering and energy efficiencies.
Figure 5:
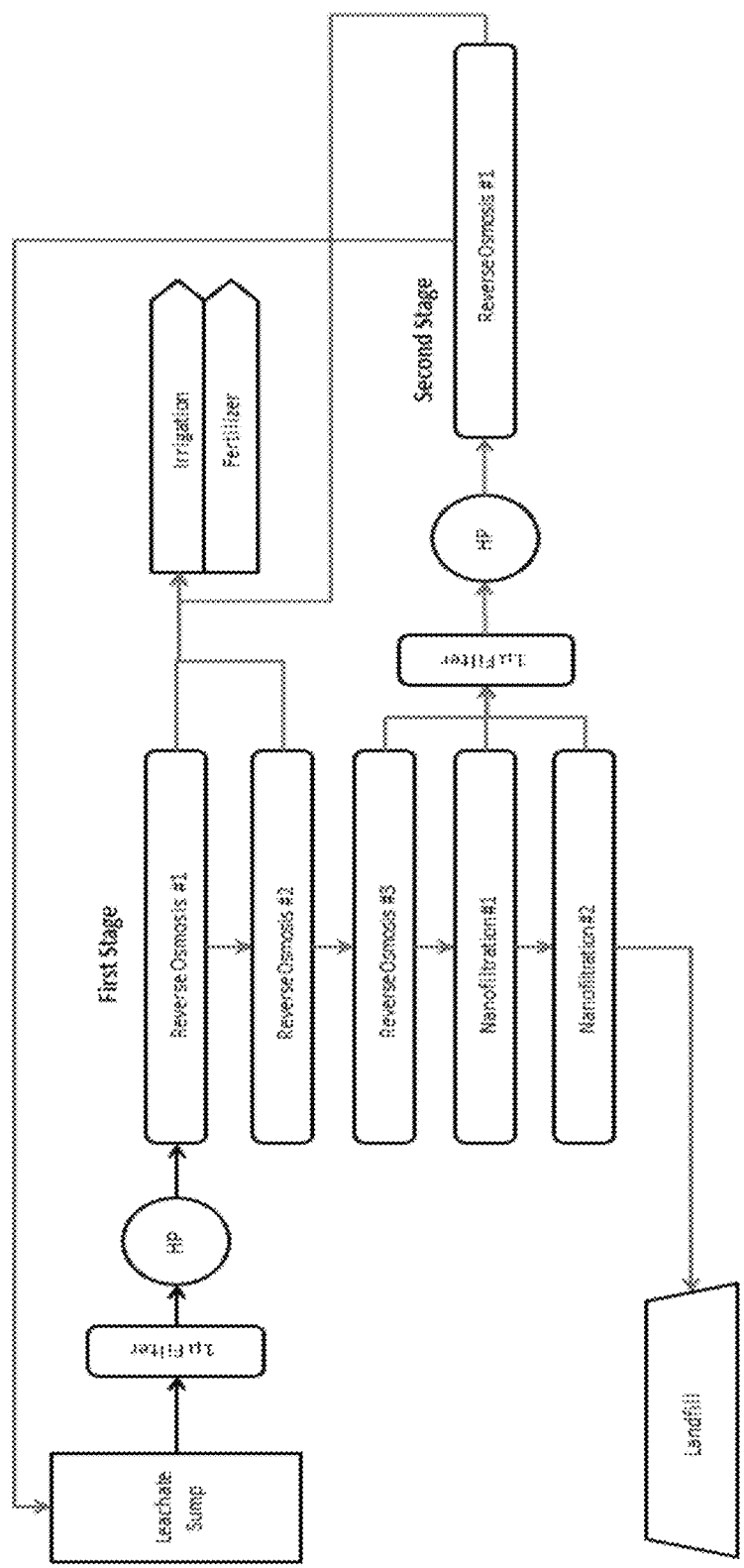
FIG. 5 shows a schematic of an alternative configuration that may realize additional dewatering and energy efficiencies.

FIGS. 4 and 5 show schematics of alternative configurations that may realize additional dewatering and energy efficiencies. FIG. 6 shows a schematic of an alternative configuration that treats the concentrate further to achieve higher permeate recovery rates. FIG. 6 illustrates the use of a surge tank, which can store the concentrate and permeate generated from one or more stages. In an embodiment, the stored concentrate and permeate can be held until a specified volume is reached and the stock in the surge tank can be introduced to the leachate. Thus the treated concentrate may be recycled to the beginning of the process, being cleaner than the feedwater. FIG. 7 shows the same process as FIG. 6 drawing from an intermediate leachate storage vessel, rather than from the sump.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measurement technique and the type of numerical value. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of this disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

We claim at least the following:

1. A recursive concentrate reduction membrane system, comprising:
 a first stage including two or more reverse osmosis membranes in fluidic communication and connected in series, wherein the system is configured to introduce a leachate to the first stage, wherein the first stage is configured to separate the leachate into a first stage concentrate and a first stage permeate;
 a second stage including two or more reverse osmosis membranes in fluidic communication and connected in series, wherein the first stage and the second stage are in fluidic communication, wherein the system is configured to introduce the first stage permeate to the second stage, wherein the second stage is configured to separate the first stage permeate into a second stage concentrate and a second stage permeate, wherein the second stage is configured to operate at about 300 psi or less pressurized;
 a filter in the first stage to prefilter the leachate prior to introduction to the first stage reverse osmosis membranes;
 a filter in the second stage to prefilter the first stage permeate prior to introduction of the first stage permeate to the second stage reverse osmosis membranes; and
 a collection tank, wherein the collection tank is configured to store leachate from the leachate source and the second stage, wherein the system is configured so that the liquid inflow is adjusted to maintain a dilution factor within a tank stock that optimizes system performance.

2. The membrane system of claim 1, wherein the system is configured so that first stage permeate is the only permeate outflow from the system.

3. The membrane system of claim 1, wherein the system is configured so that the second stage concentrate is introduced to a third stage, wherein the third stage is configured to separate the second stage concentrate into a third stage concentrate and third stage permeate.

4. The membrane system of claim 3, wherein the system is configured to introduce the blended streams of the second and third stage permeate to the leachate while the third stage concentrate is disposed of or recirculated.

5. The membrane system of claim 1, further comprising:
 a pressure exchanger in that the pressure energy is transferred from a high pressure concentrate stream from the first stage to a low pressure concentrate stream of the second stage.

6. The membrane system of claim 1, wherein the filter in the first stage is a one-micron filter.

7. The membrane system of claim 1, wherein the filter in the second stage is a one-micron filter.

* * * * *